Figure 9:
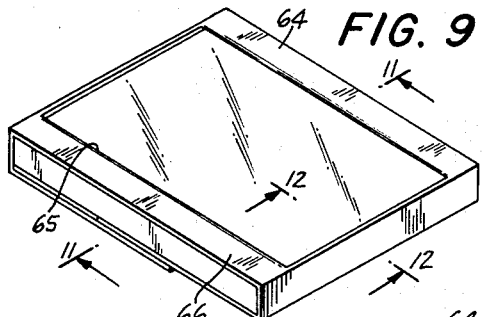

Dec. 31, 1963  H. RUMSEY, JR  3,116,154
PACKAGE FOR FOOD PRODUCT AND METHOD OF MAKING THE SAME
Filed March 23, 1962  4 Sheets-Sheet 1
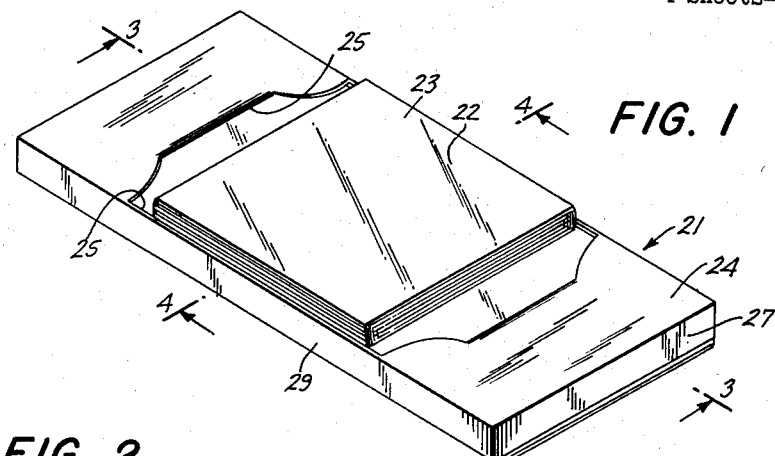
FIG. 1
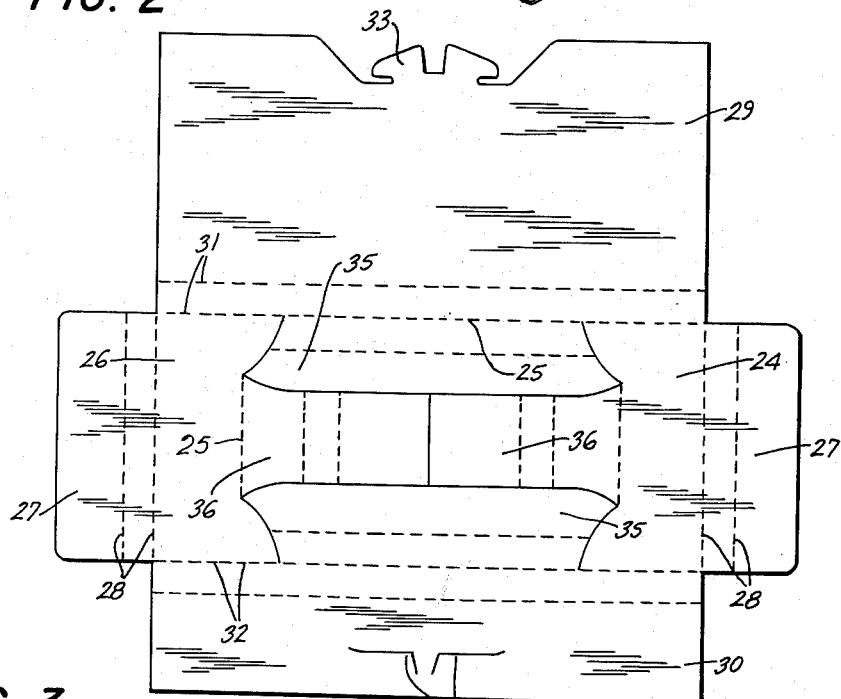
FIG. 2
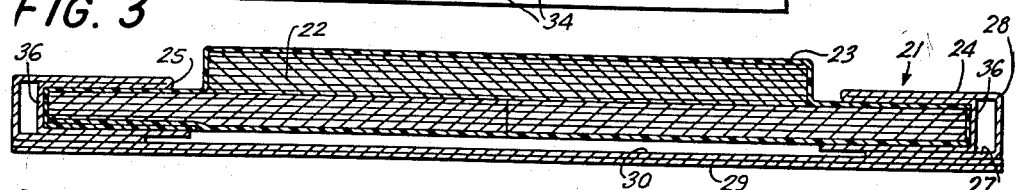
FIG. 3
FIG. 4
INVENTOR.
HERBERT RUMSEY, JR.
BY
Kane, Dalsimer and Kane
ATTORNEYS

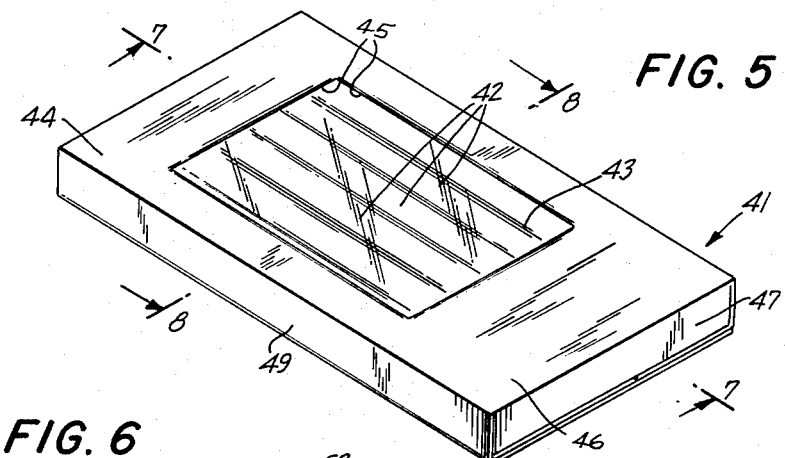
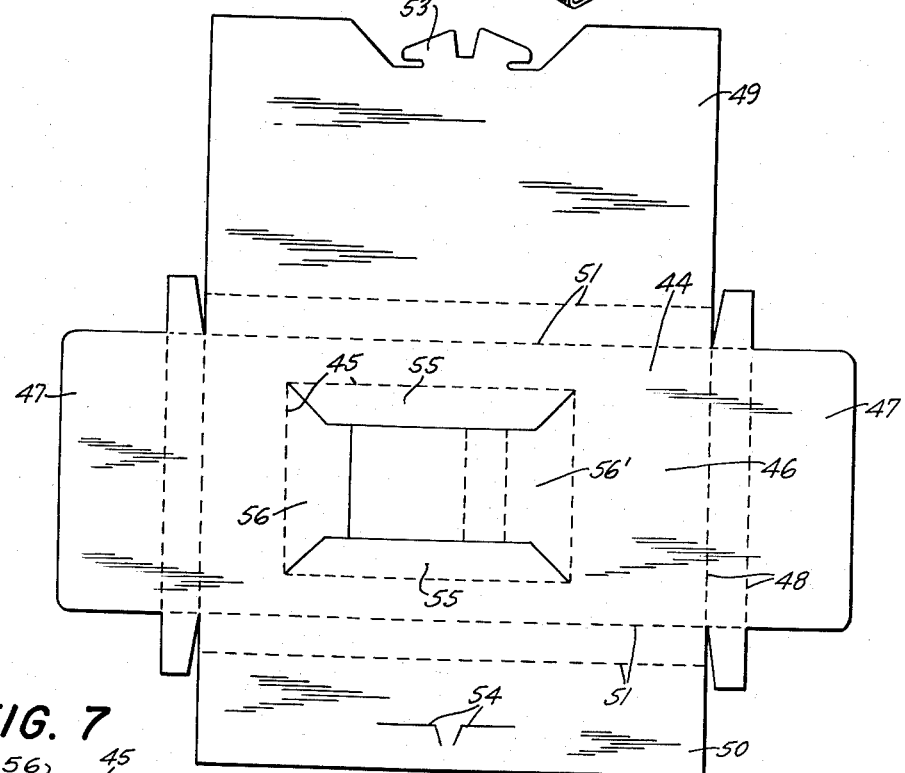
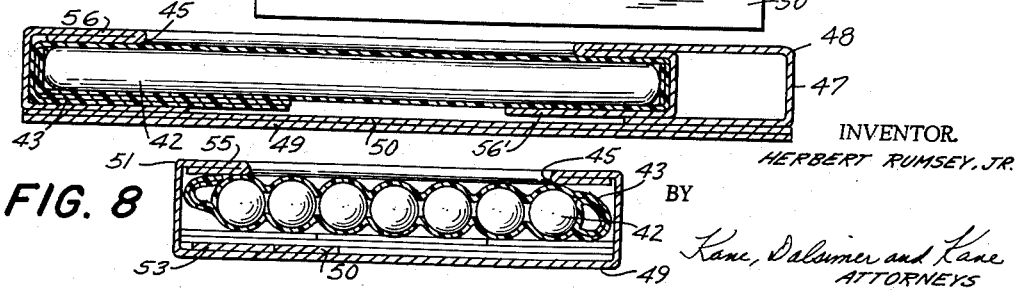

Dec. 31, 1963     H. RUMSEY, JR     3,116,154
PACKAGE FOR FOOD PRODUCT AND METHOD OF MAKING THE SAME
Filed March 23, 1962     4 Sheets-Sheet 3

INVENTOR.
HERBERT RUMSEY, JR.
BY
Kane, Dalsimer and Kane
ATTORNEYS

Dec. 31, 1963  H. RUMSEY, JR  3,116,154
PACKAGE FOR FOOD PRODUCT AND METHOD OF MAKING THE SAME
Filed March 23, 1962  4 Sheets-Sheet 4

INVENTOR.
HERBERT RUMSEY, JR.
BY
Kane, Dalsimer and Kane
ATTORNEYS

United States Patent Office 3,116,154
Patented Dec. 31, 1963

3,116,154
PACKAGE FOR FOOD PRODUCT AND METHOD OF MAKING THE SAME
Herbert Rumsey, Jr., P.O. Box 630, Rochester, N.Y.
Filed Mar. 23, 1962, Ser. No. 182,041
12 Claims. (Cl. 99—175)

This invention relates to an improved package for encasing and displaying a food product and to an improved method of making the same.

In the modern merchandising of food products, it is desirable to encase the food product and to protect it from contamination and, at the same time, to display the food product through the encasing wrapper so as to attract the attention of the shopper and so that the shopper can examine the same. In one type of display package the food product is encased in a wrapper made of a relatively stiff opaque supporting material which has a window opening through which the food product is displayed. Packages of this type have certain recognized disadvantages and give rise to certain difficulties. Thus, the material cut out from the window opening is generally wasted. Also, the provision of the window opening weakens this portion of the package with the result that it frequently becomes distorted, wrinkled and at times ruptured. For this reason, a heavier gauge cardboard, fiberboard or wrapping material is sometimes employed. In window opening packages of this type difficulty is also encountered in maintaining the food product in properly aligned relationship with respect to the window opening.

It is an object of the present invention to overcome the difficulties and disadvantages heretofore encountered and to provide an improved package having a window opening for displaying the food product contents thereof and to an improved method of making such a package in which the wrapping material cut out of the window opening is not wasted; which provides an improved reinforced construction so that the package will not readily become distorted, wrinkled or ruptured and so that a lighter gauge wrapping material may be employed; which presents an improved, attractive appearance; and in which the food products contents of the package are maintained in properly aligned relationship with respect to the window opening.

Further objects include the provision of an improved package and method of making the same which is of relatively inexpensive construction and which is relatively simple to make and assemble.

In carrying out my invention, I provide an improved supporting wrapper formed of a sheet of opaque material flexible enough to be folded and stiff enough to be self-supporting and having a flat surface intermediate its ends formed with a window opening having flaps integral with the edges thereof and projecting inwardly into the window opening. The flaps are folded inwardly against the inner edge of the wrapper presenting a rolled edge appearance around the window opening and the pressure of the food contents exerted against the inner surface of the flaps serves not only to hold the flaps in place but also to hold the food product in properly centered and aligned relationship with respect to the window opening. Preferably, at least one of the flaps is extended downwardly over or into frictional engagement with at least a portion of the food product so as to help in aligning the food product with respect to the window opening.

Another aspect of my invention includes the provision of an improved display package for sausage products in which at least one of the flaps is extended into the package to frictionally engage the side of a sausage product so as to fix and align the sausage products with respect to each other and with respect to the window opening.

Figure 13:
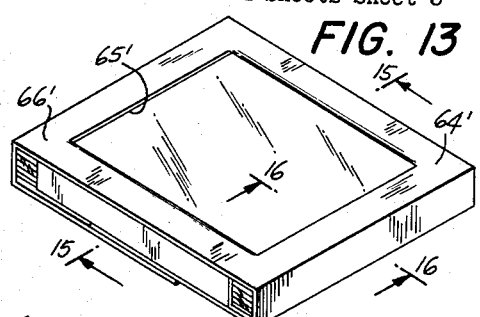
Figure 10:
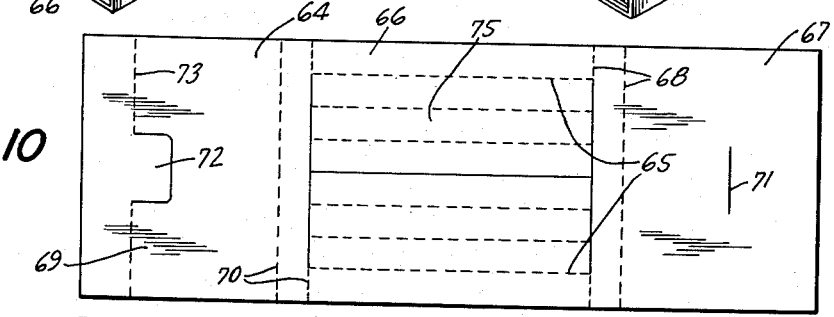
Figure 14:
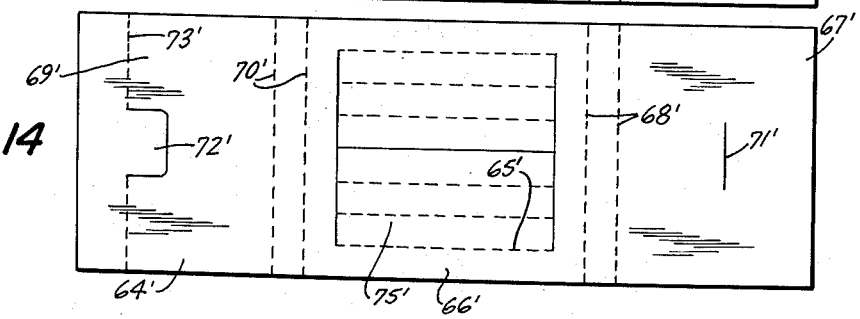
Figure 11:
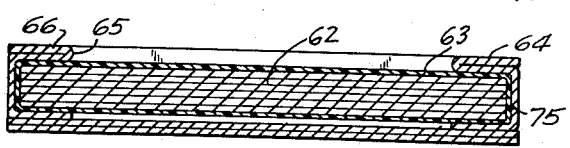
Figure 12:
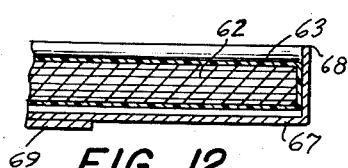
Figure 15:
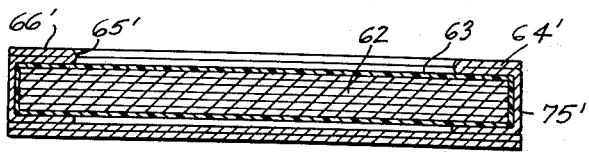
Figure 16:
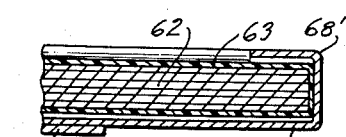
Figure 17:
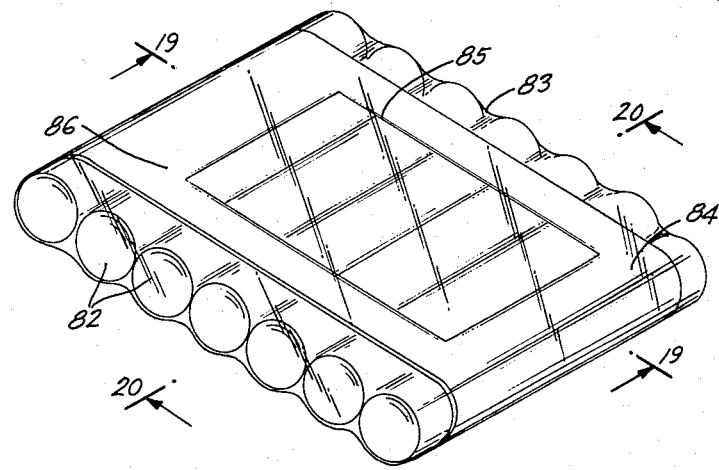
Figure 18:
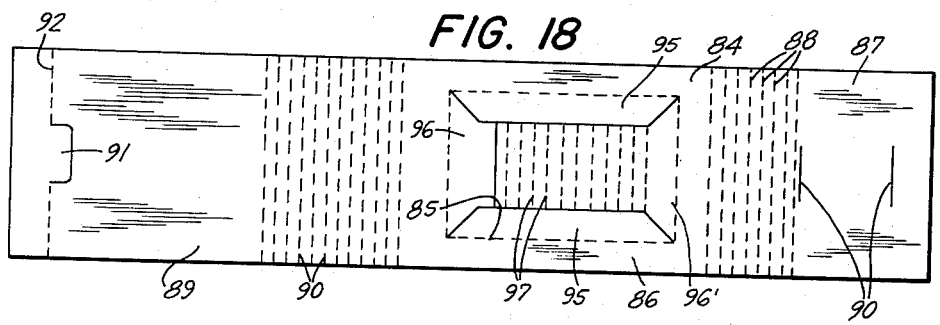
Figure 19:
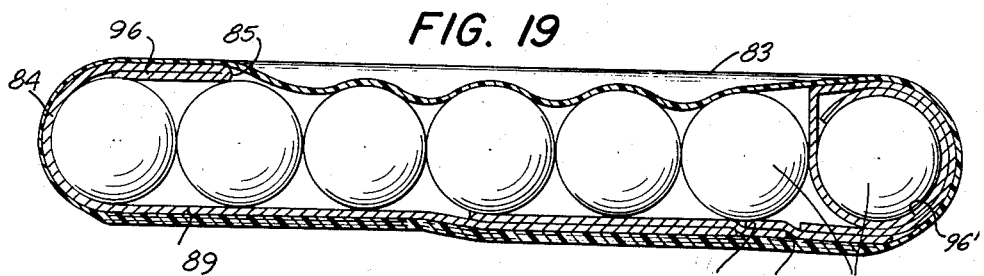
Figure 20:
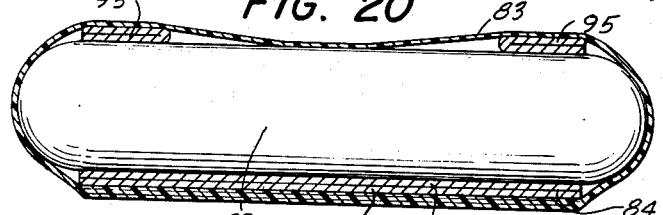
Figure 21:
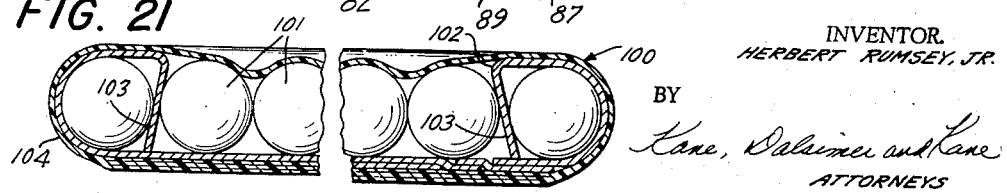

In the accompanying drawings:
FIG. 1 is a perspective view of one form of package embodying my invention;
FIG. 2 is a plan view of a wrapper blank for the package shown in FIG. 1;
FIG. 3 is a longitudinal sectional view in the direction of the arrows on the line 3—3 of FIG. 1;
FIG. 4 is a transverse sectional view in the direction of the arrows on the line 4—4 of FIG. 1;
FIG. 5 is a perspective view of a modified form of package embodying my invention and particularly adapted for use with a sausage product known as pepperoni sticks;
FIG. 6 is a perspective view of a wrapper blank for use in the package as shown in FIG. 5;
FIG. 7 is a longitudinal sectional view in the direction of the arrows on the line 7—7 of FIG. 5;
FIG. 8 is a cross-sectional view in the direction of the arrows on the line 8—8 of FIG. 5;
FIG. 9 is a perspective view of a still further modified form of package embodying my invention;
FIG. 10 is a plan view of the wrapper blank for use in making a package of the type shown in FIG. 9;
FIG. 11 is a cross-sectional view in the direction of the arrows on the line 11—11 of FIG. 9;
FIG. 12 is a detailed sectional view in the direction of the arrows on the line 12—12 of FIG. 9;
FIG. 13 is a perspective view of a still further modified form of package embodying my invention;
FIG. 14 is a plan view of a wrapper blank for use in making a package of the type shown in FIG. 13;
FIG. 15 is a cross-sectional view in the direction of the arrows on the line 15—15 of FIG. 13;
FIG. 16 is a detailed sectional view in the direction of the arrows on the line 16—16 of FIG. 13;
FIG. 17 is a perspective view of a still further form of package embodying my invention which is particularly suitable for use in wrapping sausage products such as frankfurts;
FIG. 18 is a plan view of the wrapper blank used in making a package of the type shown in FIG. 17;
FIG. 19 is a longitudinal sectional view in the direction of the arrows on the line 19—19 of FIG. 17;
FIG. 20 is a cross-sectional view in the direction of the arrows on the line 20—20 of FIG. 17; and
FIG. 21 is a longitudinal sectional view, similar to FIG. 19, of a still further modified form of package embodying my invention particularly suitable for use in wrapping sausage products.

Each of the several forms of my invention comprises a window type of package for encasing and displaying a food product. Each package is formed of a wrapper made of opaque sheet wrapping material flexible enough to be folded and stiff enough to be self-supporting. Each opaque wrapper presents a flat surface or panel intermediate its ends having a window opening with integral flaps extending from the edges of the window opening and folded inwardly against the inner surface of the wrapper and held in place by the pressure exerted by the food product contents against the flaps. At least one of the flaps has a portion extending into said package into frictional engagement with a portion of the food product so as to align the food product with respect to the window opening.

Referring to the form of package shown in FIGS. 1-4 inclusive, my improved package is indicated generally at 21 and comprises food product contents 22 prewrapped in a sheet of transparent flexible wrapping material 23 and the prewrapped food product being encased in my improved wrapper 24 having a window or display opening 25.

The food product illustrated in FIGS. 1-4 consists of three stacks of sliced cold cuts with two stacks being arranged side by side and with the third stack being arranged in overlapping superimposed relationship with respect to the two lower stacks. However, any other food product arranged in relatively flat relationship may be packaged in this form of package, such as sliced cheese, sliced luncheon meat, bacon or the like.

The wrapping material 23 may be any suitable transparent flexible sheet wrapping material, such as rubber hydrochloride, polymers or copolymers of vinylchloride, polyethylene or moisture-proof cellophane. The sheet wrapping material is preferably thermoplastic so that it can be heat sealed and is preferably of the heat shrinkable type, such as tensilized polymers or copolymers of vinylchloride, tensilized polyethylene or rubber hydrochloride. The sheet of wrapping material 23 is wrapped completely around the food product as shown with edges in overlapping relationship and the overlapping edges are preferably heat sealed together. In order to give the wrapping a smooth wrinkle-free appearance, it may then be heat shrunk by immersing it in a heated liquid, such as water, at a temperature of between 180° F. and 212° F.

The wrapper 24 is made of an opaque sheet material flexible enough to be folded but stiff enough to be self-supporting. For this purpose, I prefer to employ a sheet of fiberboard or cardboard but I may also employ a suitable plastic material. If desired, the sheet of fiberboard or cardboard can be coated or impregnated with a paraffin wax or with a resin such as a polymer or copolymer of vinylchloride, polyethylene or the like.

The blank for the wrapper is shown in FIG. 2 and it will be seen that it has one relatively flat panel or surface 26 intermediate the ends of the blank and in which the window opening 25 is formed. The panel 26 is long enough and wide enough to extend for the entire length and width of the package and has flaps 27 formed with transverse fold or score lines 28 for closing the two ends of the package. It also has laterally extending flaps 29 and 30 formed with transverse fold lines 31 and 32 for folding over the sides of the package and overlapping at the bottom of the package. Suitable fastening means are provided to releasably secure the overlapping flap portions 29 and 30 together at the bottom of the package. Thus, the flap 29 is shown as being provided with a centrally positioned notch having an undercut projecting tab 33 formed therein. The flap 30 has two complementary V-shaped slots 34 formed therein so that the two portions of the projecting tab 33 may be interengaged therewith to releasably secure the wrapping around the package.

The window opening 25 is not formed by simply blanking out a piece from the wrapper but instead it will be seen that a number of slits are formed in the panel 26 of the wrapper to provide a series of flaps integral with the side edges of the window opening and provided with transverse fold lines whereby the flaps may be folded inwardly against the inner surface of the package. In the form of wrapper shown in FIGS. 1–4, inclusive, the window opening is provided with two pairs of flaps, the flaps 35 integral with the side edges of the window opening and the flaps 36 integral with the end edges of the window opening. Each of the flaps is provided with a fold line at the edge of the window opening whereby it may be folded inwardly against the inner surface of the wrapper. The flaps 35 have one additional transverse fold line whereby the flap may be folded around the side edges of the food product. The flaps 36 have two additional transverse fold lines whereby they may be folded around the end edges of the food product and overlap the bottom thereof.

In wrapping a food product in a package of the type shown in FIGS. 1–4, inclusive, the food product is first prewrapped in the transparent wrapping material 23 as shown. The wrapper blank 24 is placed on a flat surface with the inner surface facing upwardly, as shown in FIG. 2, and the flaps 35 and 36 are then folded inwardly along the fold line at the window's edge. The food product is then placed in contact with the inner surface of the opaque wrapper in engagement with the inwardly folded flaps. The flaps 36 are then folded over the end edges of the food product so as to overlap the undersurface of the food product. It will be seen that the flaps 36 thus serve to align the food product properly with respect to the window opening and will also serve to hold the food product in this properly aligned relationship. The flaps 35 are folded downwardly along the longitudinal edges of the food product and thereafter the wrapper flaps 27 and 29 and 30 are folded inwardly to complete the package and the tab 33 is interengaged with the slots 34 so as to secure the package in closed position.

The flaps 35 and 36 are not secured to the inner surface of the wrapper 24, but as shown in FIGS. 3 and 4 are held in position in engagement with the inner surface of the wrapper by the pressure exerted against the flaps by the food product. The flaps serve to reinforce and strengthen the wrapper adjacent the window opening, thereby preventing or minimizing distortion, wrinkling and rupturing of this portion of the package. In addition, the folded flaps present the appearance of a rolled edge around the borders of the window opening. It will also be seen that the flaps have frictional engagement with the top portion and edge portions of the food product to hold it in properly aligned position.

Thus, it will be seen that the window opening is formed without the waste of material, that the wrapper is reinforced, that the wrapper presents a more attractive appearance and that the food product is maintained in properly aligned relationship with respect to the package and with respect to the window opening. In this connection, reference should be had to FIG. 3 wherein it is clearly shown how the flaps in frictional engagement with portions of the food product serve to position and align the product.

Referring now to the form of package shown in FIGS. 5–8, inclusive, as previously pointed out, this form of package is particularly suited for wrapping sausage products of the type known as pepperoni sticks. In this form of package the product is not centered in the package, but is retained in off-set relationship towards one end of the package. The flaps, nevertheless, are arranged so as to retain the food product in this off-set properly aligned relationship. In this form of package the pepperoni sticks or other sausage products are shown at 42 and they are prewrapped in an envelope of transparent wrapping material 43 which may be made of rubber hydrochloride, polymers or copolymers of vinylchloride, polyethylene, moisture-proof cellophane or the like.

The package is shown generally at 41, and my improved wrapper is shown at 44. As in the first form of my invention, it is made of a suitable opaque sheet material flexible enough to be folded, but stiff enough to be self-supporting. A relatively flat panel or surface 46 intermediate the ends of the wrapper is provided with the window opening 45. The wrapper is provided with flaps 47 projecting from the two ends of the panel 46 and having transverse fold lines 48 for closing the two ends of the package and with flaps 49 and 50 projecting from the two sides of panel 46 and having transverse fold lines 51 for folding around the longitudinal side edges and overlapping at the bottom of the package. The flap 49 is provided with an undercut locking tab 53 and the flap 50 is provided with the pair of fastening slots 54 for receiving the locking tab and releasably securing the wrapping in closed position.

In this form of package the window opening 45 is offset towards one end of the package. The window opening is not blanked out of the wrapper but as in the first form of the invention is formed by slitting the panel 46 so as to provide flaps integral with the side edges of the window and projecting towards the center of the window.

Thus, flaps 55 are provided along the side edges of the window opening 45 and flaps 56 and 56' are provided along the two end edges of the window opening. Flaps 55 and 56 are provided with fold lines along the window edges whereby the flaps may be folded inwardly. Flap 56' is considerably longer than flap 56 and in addition to the fold line along the window's edge is provided with two spaced transverse fold lines whereby flap 56' may be folded around one end edge of the food product into overlapping relationship with the undersurface thereof to thereby properly position the food product in the package and maintain it in properly aligned relationship with the window opening.

In assembling the package shown in FIGS. 5-8, inclusive, the sausage product or pepperoni sticks 42 are first prepackaged in the transparent wrapper 43. Thereafter, the blank for the wrapper 44 is placed face downwardly on a flat surface and the flaps 55, 56 and 56' are folded inwardly. The food product is placed in contact with the inner surface of the wrapper against the folded flaps 55, 56 and 56'. The flap 56' is then folded around one end edge of the food product into overlapping relationship with the opposite surface thereof. The flaps 47, 49 and 50 are then wrapped around the food product with the flaps 49 and 50 in overlapping relationship and the locking tab 53 is then inserted through the slots 54 to releasably secure the wrapper in closed relationship.

As in the first form of package, it will be seen that the wrapper is reinforced by the flaps in the area surrounding the window opening. It will also be seen that the window opening presents the appearance of having rolled edges. The frictional engagement between the food product and the flaps, particularly flap 56', serves to position the food products in off-set relationship with respect to the package and to maintain it in properly aligned relationship with respect to the window opening 45. Since the transparent wrapper 43 extends across the window opening, the food product is fully protected, but is nevertheless displayed therethrough.

Referring now to the forms of packages shown in FIGS. 9-12 and FIGS. 13-16, respectively, it will be seen that these forms of packages are particularly suitable for encasing and displaying a small flat package such as a package of sliced cold cuts, slices of cheese, and the like.

In each of these packages the sliced cold cuts or other food products 62 are prewrapped in a suitable flexible transparent sheet wrapping material 63 of the same type as the wrapping material 23 in the first form of my invention. The wrappers 64 and 64' are quite similar to each other and are made from the same type of opaque sheet material as used in the first two forms of my invention. Each of these wrappers is formed with a central relatively flat panel or surface 66 and 66' provided with window openings 65 and 65'. At one end the respective blanks are provided with flaps 67 and 67' having transverse fold lines 68 and 68' whereby the flap may be folded around one edge of the food product and overlap the lower surface thereof. At the other end the blanks are provided with flaps 69 and 69' having transverse fold lines 70 and 70' whereby these flaps may be similarly folded around the opposite edge into overlapping relationship with the flaps 67 and 67' on the lower surface of the food product.

To releasably secure the wrapper around the package, I provide the flaps 67 and 67' with fastening slots 71 and 71' and provide the flaps 64 and 64' with inwardly projecting tabs 72 and 72' which are formed by providing U-shaped slots in alignment with the fold lines 73 and 73' and which extend inwardly in a direction away from the free ends of the flaps. When the flaps 69 and 69' are folded into overlapping relationship with the flaps 67 and 67', the tabs 72 and 72' can be readily interengaged with the slits 71 and 71' simply by folding the free ends of the tabs 69 and 69' along the fold lines 73 and 73', respectively.

The window openings 65 and 65' are formed in a similar manner as the window openings in the first two forms of my invention by providing slits outlining flaps which extend inwardly towards the center of the window. In the form of device shown in FIGS. 9-12, the window opening 65 extends for the full width of the package and margins only appear along two opposite edges thereof. However, in the form of package shown in FIGS. 13-16, the window opening does not extend for the full width of the package and a margin extends completely around the window opening.

In both forms of packages only a single pair of flaps 75 and 75', respectively, are formed along one set of opposite edges of each of the window openings. The flaps 75 in the form of package shown in FIGS. 9-12 extend for the full width of the panel 66, whereas the flaps 75' in the form of package shown in FIGS. 13-16 only extend for a portion of the entire width of the panel 66'.

Both pairs of flaps 75 and 75' are provided with fold lines along the edges of the window opening and also with two additional transverse fold lines, whereby the flaps may be folded against the inner surface of the wrapper and around the end edges of the food product into overlapping relationship with the lower surface thereof. Thus, it will be seen that the flaps 75 and 75' serve as end closures for the package as well as serving to align and to position the food product therein.

In preparing the packages shown in FIGS. 9-12 and 13-16, the food product 62 is first prewrapped in the transparent flexible wrapper 63 and the wrapper blanks are placed face downwardly on a flat surface. The flaps 75 or 75' are folded inwardly and the food product is placed against the inner surface of the package and against the inwardly folded flaps. The flaps are then folded around the end edges of the food product into overlapping relationship with the opposite surface thereof. Thus, it will be seen that these flaps serve to close the end of the package and also to position and align the food product. The flaps 67 or 67' and 69 or 69' are then folded around the side edges into overlapping relationship on the opposite side of the package and the locking tabs are interengaged with the locking slots.

It will be seen that the inwardly folded flaps serve to reinforce the wrapper adjacent the window opening and that the inwardly folded flaps also serve to impart the appearance of rolled edges. In the form of package shown in FIGS. 9-12, the flaps 75 serve to completely close the end edges of the package. In the form of package shown in FIGS. 13-16 the flaps 75' serve to close the major portion of the end edges but, due to the fact that the window opening does not extend for the entire width of the package, a small portion on each side of the end edges of the package remains uncovered by the wrapper. However, since the transparent wrapper 63 extends completely around the food product, it will be appreciated that the food product is fully encased and protected. The transparent wrapper also extends across the window openings 65 and 65' and serves to protect the food product in this area while at the same time permitting it to be displayed therethrough.

In FIGS. 17-20 I have shown a form of package particularly suitable for the package of sausage products such as frankfurts. The frankfurts or other sausage products wrapped in the package are shown at 82. In this form of package the sausage products are preferably not prewrapped in a sheet of transparent wrapping material, but are encased directly in the wrapper 84. The wrapper 84 is made of similar opaque sheet wrapping material as the wrappers in the other forms of my invention, but may be of slightly lighter gauge. However, that may be, it is flexible enough to be folded and preferably stiff enough to be self-supporting.

The front panel section 86 of the wrapper is relatively flat and is provided with a window opening 85 somewhat similar to that provided in the other forms of my invention. Extending from one end of the panel section 86 is a flat portion 87 having a plurality of transverse fold lines 88 and adapted to be wrapped around one end of the package to the undersurface of the sausage products. Projecting from the other end of the panel section 86 is another flap 89 of somewhat greater length having a plurality of transverse fold lines 90 and adapted to be folded around the other end of the package into overlapping relationship with the flap 87 on the undersurface of the package.

Suitable fastening means, such as that shown in connection with the packages illustrated in FIGS. 9–16, are provided, such as the transversely disposed fastening slots 90 in the flap 87 and the fastening tab 91 formed in the flap 89. The tab 91 may be engaged with either one of the slots 90 depending upon the size of the package and the number and the size of the sausage products encased therein. The fastening tab 91 is similar to those shown in FIGS. 9–16 and faces away from the end of the flap. It is formed by means of a generally U-shaped slit communicating with the transverse fold lines 92. By bending the end of the flap 89 along the fold line 92, the tab 91 can be projected at an angle to the flap so as to readily engage with either of the slots 90.

As in the prior form of my invention, the window opening is not simply blanked out by the wrapper but is formed by means of a series of slits which provide flaps integral with the side edges of the window opening and extending towards the center thereof. Thus, the longitudinal side edges are provided with flaps 95 integral therewith and having a fold line along the edge thereof. Flaps 96 and 96' are formed integrally with the end edges of the window opening and have fold lines along such edges. The flap 96' extends for the major portion of the length of the window opening and has a plurality of transverse fold lines 97 formed therein to facilitate wrapping of the flap around one of the sausage products.

In wrapping a package of the type shown in FIGS. 17–20, the wrapper blank is first placed in inverted position on a flat surface, as shown in FIG. 18. In order to properly position the sausage products within the package, I then take one of the sausage products, place it on top of the end of the flap 96' and roll the flap around the sausage product until it is positioned at the side of the window opening wrapped in the flap as shown in FIG. 19. Either before or after thus rolling the initial sausage product in the flap 96', I fold the flaps 95 and 96 inwardly against the inner surface of the wrapper. The remaining sausage products, usually six in number, are then placed in parallel relationship transversely of the wrapper and resting on the inwardly folded flaps 95 and 96 so as to hold them in folded position.

Generally speaking, the sausage products are of greater width than the wrapper so as to project beyond the side edges thereof as shown. However, it should be understood that they may be of the same width or slightly smaller width than the wrapper.

When the sausage products are thus arranged, the tabs 87 and 89 are folded around the end edges thereof into overlapping relationship on the opposite side of the package. The multiple fold lines 88 and 90 facilitate this folding and also permit for slight variations in the length of the package resulting from using a larger size sausage product or from using a greater number of the sausage products. When the flaps are overlapped, the fastener tab 91 is engaged with one of the slots 90 so as to releasably secure the wrapper in closed position. Thereafter, a sheet of transparent flexible wrapping material 83 is wrapped around the package and the overlapping edges thereof are secured in position as by heat sealing. In this connection, the transparent wrapping material 83 is preferably similar to the transparent wrapping material 23 used in the first form of my invention, i.e., it is preferably thermoplastic so that it can be heat sealed and is also of the type which is heat shrinkable. For this purpose, I may use rubber hydrochloride, tensilized polymers or copolymers of vinylchloride, tensilized polyethylene, or the like. After the transparent wrapping material 83 is wrapped around the package, it is suitably heat shrunk as by subjecting it to a heated liquid such as hot water having a temperature of between 180° and 212° F.

It will be seen that the package thus formed is particularly suitable for sausage products, that the wrapper is reinforced around the window opening and that the edges of the window opening present an attractive rolled appearance. It will also be seen that the sausage products are maintained in proper position with respect to each other and with respect to hte window opening. In addition, the package presents the further advantages that it avoids the waste of the material cut out of the window opening, it is relatively inexpensive to manufacture and it is simple to assemble.

In FIG. 21 I have shown that further modified form of package particularly suitable for sausage products such as frankfurts. The wrapper 100 in this package is similar to the wrapper in the package shown in FIGS. 17–20, with the exception that in this package the flap is not wrapped around one of the sausage products, but instead the two flaps provided at the ends of the window opening extend inwardly across the package between the last two sausage products at each end of the package and are in frictional engagement with the sides thereof. Thus, the frankfurts 101 are encased in the wrapper 100 which in turn is encased in the transparent wrapper 104 made of thermoplastic, heat shrinkable material similar to that employed in the other form of my package. The wrapper is formed with a central flap portion having the window opening 102 therein. As in the form of package shown in FIGS. 17–20, the wrapper also has overlapping flaps at the bottom of the package which are provided with interlocking fastening means and similar longitudinal flaps are provided along the two sides of the window opening. The two flaps 103 at the ends of the window opening are long enough to extend across the package at an angle, and in assembling the package, they are extended downwardly between the last two frankfurts at the two ends of the package at an outwardly flared angle so that they are frictionally engaged with the side portions of the frankfurts. Thereafter, the wrapper is extended completely around the frankfurts and the fastening means is engaged. The transparent wrapping 104 is extended around the package, heat sealed together and then heat shrunk by being immersed in water between approximately 180° and 212° F.

It will thus be seen that in the completed package the sausage products are held in properly aligned relationship with respect to each other and with respect to the window opening by means of the flaps 103 which frictionally engage the side portions of the two frankfurts at each end of the package.

It should be understood that modifications can be made in the several embodiments of my invention without departing from the invention as set forth in the accompanying claims.

I claim:

1. A food package comprising food product contents in said package, a supporting wrapper formed of a sheet of opaque material flexible enough to be folded and stiff enough to be self-supporting, said opaque wrapper extending completely around said contents in at least one dimension and presenting a flat upper surface having a window opening therein, and a sheet of transparent flexible wrapping material extending at least across said window opening to protect and display the contents therethrough, the said opaque wrapper being provided with flaps integral with edges of said window opening and being folded inwardly against the inner surface of said wrapper adjacent said window opening with the contacting surfaces being free from attachment and being held in place by the pressure exerted by the food contents so as to reinforce the upper surface of the opaque wrapper adjacent the window opening, at least one of said flaps having a portion extending into frictional engagement with the contents to position and align said contents with respect to said window opening.

2. A food package comprising food product contents in said package, a supporting wrapper formed of a sheet of opaque material flexible enough to be folded and stiff enough to be self-supporting, said opaque wrapper extending completely around said contents in at least one dimension and presenting a flat upper surface having a window opening therein, and a sheet of transparent flexible wrapping material extending at least across said window opening to protect and display the contents therethrough, the said opaque wrapper being provided with at least a pair of flaps integral with opposite edges of said window opening and being folded inwardly against the inner surface of said wrapper adjacent said window opening with the contacting surfaces being free from attachment and being held in place by the pressure exerted by the contents thereby reinforcing the upper surface of the opaque wrapper adjacent the opening and presenting a rolled edge appearance, at least one pair of oppositely disposed flaps having end portions extending into the package into frictional engagement with spaced portions of the contents to position and align said contents with respect to said window opening.

3. A food package comprising food product contents in said package, a supporting wrapper formed of a sheet of opaque material flexible enough to be folded and stiff enough to be self-supporting, said opaque wrapper extending completely around said contents in at least one dimension and presenting a flat upper surface having a window opening therein, and a sheet of transparent flexible wrapping material extending at least across said window opening to protect and display the contents therethrough, the said opaque wrapper being provided with at least a pair of flaps integral with opposite edges of said window opening and being folded inwardly against the inner surface of said wrapper adjacent said window opening with the contacting surfaces being free from attachment and being held in place by the pressure exerted by the contents thereby reinforcing the upper surface of the opaque wrapper adjacent the opening and presenting a rolled edge appearance, at least one pair of oppositely disposed flaps having end portions extending around opposite edges of the contents to position and align said contents with respect to said window opening.

4. A food package comprising food product contents in said package, a supporting wrapper formed of a sheet of opaque material flexible enough to be folded and stiff enough to be self-supporting, said opaque wrapper extending completely around said contents in at least one dimension and presenting a flat upper surface having a window opening therein, and a sheet of transparent flexible wrapping material extending at least across said window opening to protect and display the contents therethrough, the said opaque wrapper being provided with two pairs of flaps integral with the edges of said window opening and being folded inwardly against the inner surface of said wapper adjacent said window opening with the contacting surfaces being free from attachment and being held in place by the pressure exerted by the contents thereby reinforcing the upper surface of the opaque wrapper adjacent the opening and presenting a rolled edge appearance around the window opening, said flaps having end portions extending around the opposite side edges and the opposite end edges of the contents to position and align said contents.

5. A food package comprising food product contents in said package, a supporting wrapper formed of a sheet of opaque material flexible enough to be folded and stiff enough to be self-supporting, said opaque wrapper extending completely around said contents in at least one dimension and presenting a flat upper surface having a window opening therein, and a sheet of transparent flexible wrapping material extending at least across said window opening to protect and display the contents therethrough, the said opaque wrapper having overlapping portions on the side of the package opposite the window opening with means securing said over-lapping portions together and being provided with flaps integral with edges of said window opening folded inwardly against the inner surface of said wrapper adjacent said window opening with the contacting surfaces being free from attachment and being held in place by the pressure exerted by the contents thereby reinforcing the upper surface of the opaque wrapper adjacent the opening and presenting a rolled edge appearance, at least one of said flaps having an end portion extending around an edge of the contents to position and align said contents.

6. A food package comprising sausage products arranged in parallel relationship transversely of said package, a supporting wrapper formed of an elongated sheet of opaque material flexible enough to be folded and stiff enough to be self-supporting, said opaque wrapper extending lengthwise of said package completely around said transversely disposed sausage products and presenting a flat upper surface having a window opening therein, and a sheet of transparent flexible wrapping material extending at least across said window opening to protect and display the sausage products thereto, the said opaque wrapper having overlapping portions on the side of the package opposite the window opening with means securing said overlapping portions together and being provided with flaps integral with edges of said window opening folded inwardly against the inner surface of said wrapper adjacent said window opening with the contacting surfaces being free from attachment and being held in place by the pressure exerted by the sausage products thereby reinforcing the upper surface of the opaque wrapper adjacent the opening and presenting a rolled edge appearance around the window opening, at least one of said flaps having an end portion extending into the package into frictional engagement with the side of a sausage product at one end of the package to serve to position and align said sausage products in said package.

7. A food package comprising sausage products arranged in parallel relationship transversely of said package, a supporting wrapper formed of an elongated sheet of opaque material flexible enough to be folded and stiff enough to be self-supporting, said opaque wrapper extending lengthwise of said package completely around said transversely disposed sausage products and presenting a flat upper surface having a window opening therein, and a sheet of transparent flexible wrapping material extending at least across said window opening to protect and display the sausage products thereto, the said opaque wrapper having overlapping portions on the side of the package opposite the window opening with means securing said overlapping portions together and being provided with flaps integral with edges of said window opening folded inwardly against the inner surface of said wrapper adjacent said window opening with the contacting surfaces being free from attachment and being held in place by the pressure exerted by the sausage products thereby reinforcing the upper surface of the opaque wrapper adjacent the opening and presenting a rolled edge appearance around the window opening, one of said flaps having an end portion extending around the sausage product at one end of the package to serve to position and align said sausage products in said package.

8. The method of forming a food package comprising first providing a supporting wrapper formed of a sheet of opaque material flexible enough to be folded and stiff enough to be self-supporting, said wrapper having a flat portion intermediate the ends thereof and formed with a window opening having flaps extending into the window opening and integral with the edges thereof, then folding the flaps inwardly against the inner surface of the wrapper adjacent the window portion, thereafter placing the food contents against the inner surface of the wrapper and in contact with said flaps so as to hold them in inwardly folded position and extending at least one of said flaps downwardly into said package and in frictional engagement with a portion of said food contents so as to position and align said food contents with respect to the window opening, then folding said wrapper completely around said food contents in at least one direction with the end portions of said wrapper in overlapping relationship on the side of the package opposite the window opening, and finally securing said overlapping portions of the wrapper together.

9. The method of forming a food package comprising first providing a supporting wrapper formed of a sheet of opaque material flexible enough to be folded and stiff enough to be self-supporting, said wrapper having a flat portion intermediate the ends thereof and formed with a window opening having flaps extending into the window opening and integral with the edges thereof, then folding the flaps inwardly against the inner surface of the wrapper adjacent the window portion, thereafter placing the food contents against the inner surface of the wrapper and in contact with said flaps so as to hold them in inwardly folded position and extending at least one of said flaps downwardly around at least one edge of said food contents so as to position and align said food contents with respect to the window opening, then folding said wrapper completely around said food contents in at least one direction with the end portions of said wrapper in overlapping relationship on the side of the package opposite the window opening, and finally securing said overlapping portions of the wrapper together.

10. The method of forming a sausage product package for encasing and displaying sausage products comprising providing a supporting wrapper formed of a sheet of opaque material flexible enough to be folded and stiff enough to be self-supporting, said opaque wrapper having a flat portion intermediate its ends with a window opening having flaps integral with the edges thereof and extending into said window opening and having fold lines along the edges of said window opening, at least one of said flaps having an extension, folding the extension of said last-mentioned flap into the package and into frictional engagement with a side portion of a sausage product so as to secure said sausage product with respect to said wrapper and folding the remaining flaps inwardly against the inner surface of the wrapper while assembling the remainder of the sausage products in parallel relationship to the first sausage product against the inner surface of said wrapper and against said folded flaps to secure them in position, thereafter wrapping said wrapper completely around said sausage products with the end portions of the wrapper in overlapping relationship, and finally securing together the overlapping portions of said wrapper.

11. The method of forming a sausage product package for encasing and displaying sausage products as set forth in claim 10 in which a transparent thermoplastic, heat shrinkable material is wrapped around the package, sealed in place and thereafter heat shrunk so as to cause it to stretch tightly around the package substantially free from wrinkles.

12. The method of forming a sausage product package for encasing and displaying sausage products comprising providing a supporting wrapper formed of a sheet of opaque material flexible enough to be folded and stiff enough to be self-supporting, said opaque wrapper having a flat portion intermediate its ends with a window opening having flaps integral with the edges thereof and extending into said window opening and having fold lines along the edges of said window opening, at least one of said flaps having an extension extending across a major portion of the window opening and having a plurality of transverse fold lines, wrapping the extension of said last-mentioned flap around a sausage product so as to secure said sausage product with respect to said wrapper and folding the remaining flaps inwardly against the inner surface of the wrapper while assembling the remainder of the sausage products in parallel relationship to the first sausage product against the inner surface of said wrapper and against said folded flaps to secure them in position, thereafter wrapping said wrapper completely around said sausage products with the end portions of the wrapper in overlapping relationship, and finally securing together the overlapping portions of said wrapper.

References Cited in the file of this patent

UNITED STATES PATENTS

| | | |
|---|---|---|
| 2,637,481 | Adams | May 5, 1953 |
| 2,804,258 | Petter | Aug. 27, 1957 |